United States Patent
Hoffman et al.

(10) Patent No.: US 12,118,090 B2
(45) Date of Patent: Oct. 15, 2024

(54) ZERO-DAY PATCHING WITHIN AN ENTITY'S SECURE NETWORK

(71) Applicant: Bank of America Corporation, Charlotte, NC (US)

(72) Inventors: Kevin Hoffman, Yulee, FL (US); Adam J. Shields, St. Augustine, FL (US)

(73) Assignee: Bank of America Corporation, Charlotte, NC (US)

( * ) Notice: Subject to any disclaimer, the term of this patent is extended or adjusted under 35 U.S.C. 154(b) by 193 days.

(21) Appl. No.: 17/961,738

(22) Filed: Oct. 7, 2022

(65) Prior Publication Data
US 2024/0119154 A1   Apr. 11, 2024

(51) Int. Cl.
*G06F 21/57* (2013.01)

(52) U.S. Cl.
CPC ........ *G06F 21/57* (2013.01); *G06F 2221/033* (2013.01)

(58) Field of Classification Search
CPC ............................ G06F 21/57; G06F 2221/033
See application file for complete search history.

(56) References Cited

U.S. PATENT DOCUMENTS

| 2005/0257214 A1* | 11/2005 | Moshir | G06F 8/65 717/171 |
| 2014/0031024 A1* | 1/2014 | Xie | G06Q 20/36 455/418 |
| 2021/0067607 A1* | 3/2021 | Gardner | H04L 41/082 |

* cited by examiner

*Primary Examiner* — Frantz B Jean
(74) *Attorney, Agent, or Firm* — Weiss & Arons LLP

(57) ABSTRACT

A system that involves a secure network, an unsecure network and a bridge server is provided. The bridge server may retrieve updates to applications from the unsecure network. The bridge server may store the retrieved updates on a secure storage location within the secure network. Devices located on the secure network may continually, periodically or otherwise check the secure storage location for updates. The updates may be downloaded to the devices for execution on the devices.

20 Claims, 7 Drawing Sheets

Index of libs-release-local-generic-dml/com/oracle/java/jre/all

| Name | Last Modified | Size |
|---|---|---|
| ../ | | |
| release_22/ | 09-May-2018 11:31 | - |
| release_23/ | 12-Dec-2018 14:01 | - |
| release_24/ | 12-Dec-2018 14:01 | - |
| release_25/ | 12-Dec-2018 14:01 | - |
| release_26/ | 12-Dec-2018 14:01 | - |
| release_27/ | 12-Dec-2018 14:01 | - |
| release_28/ | 12-Dec-2018 14:01 | - |
| release_29/ | 27-Apr-2020 16:56 | - |
| release_30/ | 31-Jul-2020 11:22 | - |
| release_31/ | 29-Oct-2020 11:36 | - |
| release_32/ | 09-Feb-2021 10:09 | - |
| release_33/ | 07-May-2021 11:19 | - |
| release_34/ | 20-Aug-2021 10:39 | - |
| release_35/ | 01-Nov-2021 14:11 | - |
| release_36/ | 01-Feb-2022 10:57 | - |
| release_37/ | 20-May-2022 10:34 | - |
| release_38/ | 18-Aug-2022 17:45 | - |
| JAVA_JREUPDATE_23.exe | 12-Feb-2019 17:42 | 423.10 MB |
| JAVA_JREUPDATE_24.exe | 04-Mar-2019 10:54 | 432.48 MB |
| JAVA_JREUPDATE_25.exe | 09-May-2019 12:09 | 437.83 MB |
| JAVA_JREUPDATE_26.exe | 26-Aug-2019 16:14 | 438.20 MB |
| JAVA_JREUPDATE_27.exe | 06-Nov-2019 10:52 | 403.54 MB |
| JAVA_JREUPDATE_28.exe | 05-Mar-2020 09:26 | 403.77 MB |
| JAVA_JREUPDATE_29.exe | 13-May-2020 17:37 | 404.98 MB |
| JAVA_JREUPDATE_30.exe | 17-Aug-2020 16:27 | 423.94 MB |
| JAVA_JREUPDATE_31.exe | 10-Dec-2020 11:27 | 414.41 MB |
| JAVA_JREUPDATE_32.exe | 09-Feb-2020 17:16 | 417.68 MB |
| JAVA_JREUPDATE_33.exe | 25-Jun-2021 13:45 | 420.84 MB |
| JAVA_JREUPDATE_34.exe | 18-Aug-2021 18:05 | 422.55 MB |
| JAVA_JREUPDATE_34.exe | 23-Nov-2021 10:13 | 424.89 MB |
| JAVA_JREUPDATE_36.exe | 05-May-2022 10:26 | - |
| JAVA_JREUPDATE_37.exe | 20-May-2022 10:28 | 429.45 MB |
| JAVA_JREUPDATE_37.txt | 24-May-2022 04:06 | 260 bytes |

ZERO-DAY PATCHING WITHIN AN ENTITY'S SECURE NETWORK

FIELD OF TECHNOLOGY

The field of technology relates to securely updating applications within a network.

BACKGROUND OF THE DISCLOSURE

Computing entities typically release backend applications for use on end-user computers. These backend applications may be downloaded from one or more internet locations to the end user computers. These backend applications may provide backend resources for front-end applications executing on the computers. These backend applications may include software code libraries, uniform resource locators ("URLs"), software programs and any other suitable resources for the frontend applications.

The front-end applications may be created by other entities that are not related to the entities that release the backend applications. As such, the front-end applications may direct the end user computers as to which backend applications are required to be installed in order for the frontend applications to execute properly. It should be noted that the front-end applications may have also downloaded the back-end applications from the one or more internet locations.

At times, the frontend applications may be dynamically updated. As such, each update to a frontend application may be automatically downloaded by the end user computer. However, it should be noted that an update to a frontend application may involve a newer version of a backend application. Additionally, the backend applications may not be automatically downloaded to an end user computer. Furthermore, the backend application may be prevented from being downloaded, either automatically or manually, to the user computer because of a security protocol on the end user computer. Therefore, the update to the frontend application may render the frontend application incompatible with the end user computer.

In order to avoid incompatibility between an updated frontend application and an end user computer, it would be desirable for the end user computer to automatically download updates as the updates are made available on a public location. However, this may be unavailable to the end user computer because of the security protocols. Therefore, it would be desirable for a server within a secure network to have limited access to both an internet location that stores the downloadable updates to the backend application as well as the end user computer.

Additionally, it would be further desirable to check compatibility with each frontend application, installed on the end user computer, that interacts with the updated backend application.

In the event that there is a compatibility conflict between a frontend application installed on the end user computer and the updated backend application, it would be desirable to roll back the updated backend application to a previously installed version of the backend application in order to resolve the compatibility conflict.

SUMMARY OF THE DISCLOSURE

Systems, apparatus, and methods for initiating zero-day patching is provided. A third-party application, such as a backend application, may be resident on a computer, or other computing device. The computer, or other computing device, may be located within an entity's secure network. The third-party application may have been created by a third-party. The computer may have downloaded the third-party application. The third-party application may provide backend resources to one or more frontend applications executing on the computer.

The third-party may release updates to the third-party application. The updates may be posted to an internet location for downloading by end user computers. However, because the computer may be located within the entity's secure network, the updates may be inaccessible to the end user computer. Therefore, a system that interacts both with the end user computer and the internet location may enable the third-party application executing on the end user computer to be updated.

A first server may link the internet location and the end user computer. The first server may be a computing device. The first server may be a desktop, laptop, tablet, mobile phone, or any other suitable computing device. In some embodiments, the first server may be included in an entity's secure network. In other embodiments the first server may not be included in the entity's secure network.

Methods may include continually searching, at a first server, for one or more published third-party application updates. Continually searching for published third-party application updates may include scanning a predetermined network for one or more published third-party application updates. The predetermined network may be the Internet. The predetermined network may be any suitable network. As such, the first server may search an internet location, intranet location, network location or any other suitable location for published third-party application updates.

Many times, a third-party may post updates to one or more specified websites. As such, the first server may initiate the search at the one or more specified websites.

The published third-party application updates may be any suitable published third-party application updates that may be executed on a computing device. In some embodiments, a published third-party application update may be a Java® update.

The search process, executed by the first server, may include downloading the one or more published third-party application updates from the predetermined network. The third-party application updates may be downloaded to a local computing device. The local computing device may be located at the first server. The local computing device may be the first server.

The first server may store the downloaded published third-party application updates at an entity server. At times, the first server may instruct the entity server to store the downloaded published third-party application updates. It should be noted that the entity server may be located within an entity's secure network. Therefore, the updates stored at the entity server may be accessibly by user computers included in the entity's secure network.

In some embodiments, methods may include executing the third-party application on a user computer. The user computer may be included in the entity's secure network. The user computer may be a laptop, desktop, smartphone, mobile device, tablet, or any other suitable computing device. The user computer may include a hardware processor, hardware memory and any other suitable hardware and software components. The third-party application may be executed during execution of a front-end application.

Execution of the third-party application may trigger the user computer to scan the entity server for stored published third-party application updates. There may be other triggers that trigger the user computer to scan the entity server for stored published third-party applications. Those other triggers may include a schedule, such as the lapse of a predetermined time period (e.g., 1 hour, 24 hours, 7 days, etc.).

In some embodiments where the scanning is not triggered by the execution of the third-party application, scanning may include determining if the third-party application is already installed on the user computer. If the third-party application is not installed, the user computer may install the latest available version of the third-party application. If the third-party application is installed, methods may further include identifying the currently installed version of the third-party application.

Identifying the currently installed version of the third-party application may include identifying the installation edition of the currently installed version of the third-party application. The installation edition may be a 32-bit file. The installation edition may be a 64-bit file. Identifying the currently installed version of the third-party application may also include identifying the installation product of the currently installed version of the third-party application.

In the event that the third-party application is a Java® application, identifying the currently installed Java® application may include identifying an installation subsystem. The installation subsystem may be a Java Virtual Machine (JVW®). The installation subsystem may be Java Development Kit (JDK®). Identifying a currently installed version of Java® may also include identifying an installation product. The installation product may be a BladeLogic® installation product. BladeLogic® may be an automated management control suite. The installation product may be a standard installation product.

Identifying the currently installed version of the third-party application may include identifying a semantic version number of the currently installed version of the third-party application. The semantic version number may include a major version number, a minor version number and a patch level. The first digit of the semantic version number, left to right, may be the major version number. The second digit, left to right, may represent the minor version number. The third digit, left to right, may represent the patch level. It should be noted that when a semantic version number includes one digit, the one digit represents the major version number, the minor version number is equivalent to zero and the patch level is equivalent to zero. Furthermore, when a semantic version number includes two digits, the left digit represents the major version number, the right digit represents the minor version number, and the patch level is equivalent to zero. The semantic version number may determine the version number of the third-party application.

Identifying the semantic version number of the currently installed version of the third-party application may include identifying the major version number, minor version number, and patch level of the currently installed version of the third-party application.

Methods may include identifying a semantic version number of the most recent published third-party application update. Identifying the sematic number may include identifying a major version number, a minor version number, and a patch level of the most recent published third-party application update. The semantic version number may be ordered from left to right: major version number, minor version number and patch level.

Methods may also include comparing the semantic version number of the currently installed version of the third-party application with the semantic version number of the most recent published third-party application update. Comparing semantic version numbers may include initially comparing the major version number of the currently installed application to the major version number of the most recent published update.

When the major version number of the most recent published update is determined to be less than the major version number of the currently installed application, the comparing may determine that the most recent published update is not a more recent update version of the currently installed application.

When the major version number of the most recent published update is determined to be greater than the major version number of the currently installed version, the comparing may determine that the most recent published third-party application update is more recent than the currently installed application.

When the major version numbers are equivalent, the comparing may include a comparison between the minor version number of the currently installed version and the minor version number of the most recent published update.

When the minor version number of the most recent published update is less than the minor version number of the currently installed version, the comparing may determine that the most recent published update is not a more recent update of the currently installed application.

When the minor version number of the most recent published update is determined to be greater than the minor version number of the currently installed version, the comparing may determine that the most recent published third-party application update is a more recent update of the currently installed application.

When the minor version numbers are determined to be equivalent, the comparing may include a comparison between the patch level of the currently installed application and the patch level of the most recent published update.

When the patch level of the most recent published update is determined to be less than the patch level of the currently installed third-party application, the comparing may determine that the most recent published update is not a more recent update of currently installed application.

When the patch level of the most recent published third-party application update is determined to be greater than the patch level of the currently installed third-party application, the comparing may determine that the most recent published update is a more recent update of the currently installed application.

When the patch levels are determined to be equivalent, the comparing may determine that the most recent published update is the same version as the currently installed version.

When the currently installed version is determined to be equivalent to, or greater than the most recent update, the patching process may abort. When the most recent published update is determined to be a more recent version than the currently installed third-party application, the patching process may continue.

The patching process may include building a dynamic Uniform Resource Locator (URL). The URL may enable the user computer to download the most recent third-party application update. The URL may include a reference to the installation product identified from the currently installed version. The dynamic URL may also include the installation edition identified from the currently installed version. The dynamic URL may also include the semantic version number of the most recent published third-party application update. The semantic version number may include the major version number, the minor version number and the patch level.

In the event when the third-party application is a Java® application, the dynamic URL may also include the installation file subsystem identified from the currently installed version of Java®.

Methods may also include downloading, from the entity server, the most recent published third-party application update to the user computer. Methods also include installing the most recent published third-party application update at the user computer.

In some embodiments, methods may include installing the most recent published version of the third-party application on substantially all computers included in the secure entity network. Such an installation may be initiated upon determination that at least one user computer that the most recent published third-application update is a more recent version than the currently installed version of the third-party application.

When the currently installed version of the third-party application is incompatible with one or more applications on the user computer, method may include reverting to a previous version of the third-party application. The reverting may include identifying a second to last installed version of the third-party application.

Identifying a second to last version may include identifying the semantic version number of the currently installed version of the third-party application. Methods may also include identifying the semantic version number of the previously installed version of the third-party application update. Methods may further comprise redownloading from the entity server the previous version of the third-party application. Methods further include reinstalling the previous version of the third-party application at the user computer.

The second to last installed version of the third-party application may be a version identified on the entity server as directly underneath the currently installed version. The version directly underneath the currently installed version may be a previously installed version of the third-party application.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 7 shows still yet another illustrative diagram in accordance with principles of the invention.

DETAILED DESCRIPTION OF THE DISCLOSURE

Figure 1:
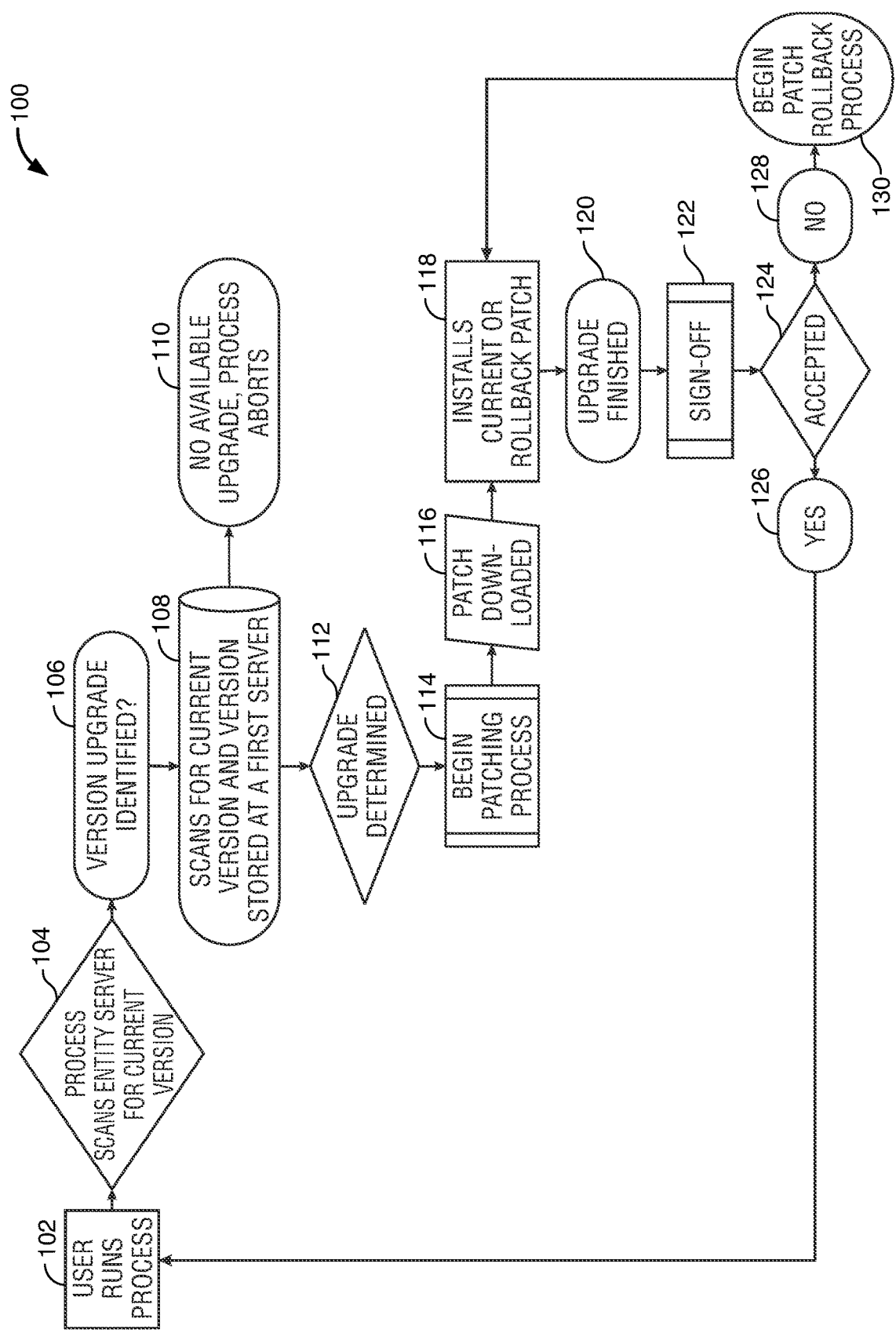
FIG. 1 illustrative diagram in accordance with principles of the invention.

Apparatus, methods, and systems for initiating zero-day patching is provided. Apparatus may include a user computer. The user computer may be a laptop, desktop, smartphone, mobile device, tablet, or any other suitable computing device. The user computer may include a processor, ROM, RAM, input/output terminals, non-transitory or non-volatile memory, or any other suitable computing device components. The non-volatile or non-transitory memory may be configured to store software included in the operating system, application programs, along with any data needed for the operation of the operating system. The user computer may comprise any other components used for computers.

The user computer may be part of an entity's secure network. The entity's secure network may be a local area network (LAN), wide area network (WAN), edge computing network or any other suitable network. The entity's secure network may include an entity server. The entity server may be a laptop, desktop, smartphone, mobile device, tablet, or any other suitable computing device. The entity's secure network may include one or more user computers. The one or more user computers and the entity server may be connected via transmission control protocol/internet protocol (TCP/IP), Ethernet, file transfer protocol (FTP), hypertext transfer protocol (HTTP), and any other suitable connection medium.

The user computer may be configured to execute a third-party application. The third-party application may be a backend application. The backend application may be executed when a frontend application is being executed. To ensure that the currently installed version of the backend application is the most recent version of the backend application, the execution of the third-party application may trigger the user computer to scan the entity server for any available third-party application updates.

In some embodiments, the user computer may be configured to scan the entity server for updates at predetermined time intervals, such as 1 hour, 24 hours, 7 days or any other suitable time interval.

At times, third-party vendors may update their respective third-party applications. Third-party vendors may publish the updates on a predetermined network such as, the Internet, an intranet, or any other suitable network. Entities may have security protocols in order to protect the entity from possible viruses, ransomware, or any other detriment from outside sources. The security protocols may include preventing downloading files from external sources. As such, the entity server may be unable to access or download the published third-party application updates.

In order to protect the entity and enable the devices to receive the updates, the apparatus may include a first server. The first server may be a mainframe, desktop, laptop, mobile device, smartphone, tablet, or any other suitable computing device. The first server may be included in the entity's secure network. The first server may have limited access within the secure network. The limited access may ensure that the network remains secure.

The first server may have access to the Internet, an intranet or any other desired network. The first server may be configured to search the Internet or a predetermined network location for published third-party application updates. The first server may download the third-party application updates. The first server may store the downloaded third-party application updates at a memory associated with the entity server. The first server may serve as a link between the entity's secure network and the predetermined network location.

In other embodiments the first server may not be included within the entity's secure network. The entity server may have limited access to the first server in order to securely retrieve the downloaded third-party application updates. The entity server may be configured to scan the first server for downloaded third-party application updates. The entity server may store the downloaded third-party application updates at a memory location associated with the entity server.

The user computer may be configured to scan the entity server for third-party application updates. The third-party application may be a Java® application. The user computer may be configured to identify an installation product, installation edition, and a semantic version number of the currently installed third-party application. In the event that the third-party application is a Java® application, the user computer may be further configured to identify an installation subsystem.

The installation edition identification may include identifying if the installation edition is a 32-bit edition or a 64-bit edition. The installation product identification may further include identifying whether the installation product used is a first installation product or a second installation product. The semantic version number identification may include identifying the major version number, the minor version number and the patch level of the semantic version number.

In the event that the third-party application is a Java® application, the installation subsystem identification may include identifying if the installation subsystem use is a Java® Virtual Machine (JVM®) or a Java® Development Kit (JDK®).

Also, in the event that the third-party application is a Java® application, the installation product identification may include identifying if the installation product used to install the application is a BladeLogic installation, standard installation or any other suitable installation product.

The user computer may be configured to identify a semantic version number of the most recent published third-party application update. The identification may comprise identifying a major version number, a minor version number and a patch level of the most recent published third-party application update.

The user computer may be configured to compare the semantic version number of the currently installed third-party application to the semantic version number of the most recent published version of the third-party application update.

The user computer may be configured to compare the major version numbers of the currently installed version of the third-party application and the most recent published third-party application updates. When the major version of the current version and the most recent update are equivalent, the user computer may compare the minor version number. When the minor version numbers of the current version and the most recent update are equivalent, the user computer may compare the patch levels of the semantic version numbers.

When the semantic version number of the currently installed version of the third application is determined to be greater than the semantic version number of the most recent published third-party application update, the most recent published third-party update is not a more recent version of the third-party application. When the semantic version number of the currently installed version of the third-party application is determined to be equivalent to the semantic version number of the most recent published third-party application update, the most recent published third-party update is not a more recent version of the third-party application. When the most recent published third-party update is not a more recent version of the third-party application, the user computer may be configured to end the patching process.

When the semantic version number of the currently installed version of the third application is determined to be greater than the semantic version number of the most recent published third-party application update, the most recent published third-party update is a more recent version of the third-party application. When the most recent published third-party update is a more recent version of the third-party application, the user computer may be configured to download the most recent published third-party application update.

The user computer may be configured to build a dynamic URL for the most recent published third-party application update. The user computer may use the installation product and installation edition previously identified to build the dynamic URL. The user computer may use the sematic version number of the most recent published third-party application update to build the dynamic URL. In the event when the third-party application update is a Java® update, the user computer may also use the installation subsystem to build the dynamic URL.

The user computer may be further configured to download, from the entity server, the most recent published third-party application update. The entity server may access the update using the dynamic URL. The user computer may install the most recent published third-party application update.

In the event that the most recent third-party application update is a backend application and is incompatible with one or more frontend applications installed on the user computer, the user computer may be configured to initiate a rollback process.

The rollback process may include identifying the semantic version of the currently installed version of the third-party application. The sematic version number may include a major version number, a minor version number and a patch level. The rollback process may also include identifying a version of the third-party application that was the second to last installation. As such, the second to last installation version may have been installed directly prior to the currently installed version. The second to last installation version may be a previous version of the third-party application. Identifying the previous version of the third-party application may include identifying the sematic version number of the previous version of the third-party application. The semantic version number may include a major version number, a minor version number and a patch level.

The user computer may be configured to revert to the previous version of the third-party application. The user computer may reinstall the previous version of the third-party application. The reinstallation of the previous version may overwrite the currently installed version. The reinstallation of the previous version of the third-party application may allow for the compatibility with one or more frontend applications.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram of process 100. At step 102, a user and/or user computer may run a process. The process may include executing a third-party application. The third-party application may be a backend application and/or a frontend application. The third-party application may be used to provide resources for a frontend application. The third-party application may be triggered by the user and/or user computer executing a frontend application that utilizes the third-party application.

Executing the third-party application may initiate an executable process and/or command on the user computer. The executable process and/or command may involve updating the third-party application. The executable process and/or command may initiate step 104.

At step 104, the process may scan the user computer to identify the currently installed version of the third-party application. The scanning may include identifying an installation edition and installation product of the current version of the third-party application. The scanning may also include identifying the sematic version number of the current version of the third-party application.

At step 106, the process may include identifying whether a version upgrade is available. The process may include scanning an entity server and/or entity server website. The entity server and/or entity server website may include a plurality of links. The plurality of links may direct a user to third-party application updates that have been approved for the entity. The approved updates may have been downloaded from a website external to the entity to a website internal to the entity. As such, process may identify a semantic version number of the most recent published third-party application update.

At step 108, the process may include comparing the semantic version number of the current version installed on the user computer, identified in step 104, to the semantic version number of the most recent published update, identified in step 106.

When the semantic version numbers of the current version and the most recent published update are the same, the current version may be the most recent version. Therefore, when the semantic version numbers are the same, the process may continue to step 110 and abort.

When the semantic version number of the most recent published update is greater than the semantic version number of the current version, the process may continue to step 112. At step 112, the process determines that an upgrade is available for the user computer.

Step 114 shows that once an upgrade is determined to be available, a patching process may be initiated. At times, the patching process may include building a dynamic URL for the user computer to access the most recent published third-party application update. The dynamic URL may include an installation edition, identified in step 104, an installation product, identified in step 104, and the semantic version number of the most recent published third-party application update, identified in step 106.

Step 116 shows the patch being downloaded. The patch may be the third-party application update. It should be noted that the patch may be a complete application and/or a partial application. A complete application may completely overwrite the previously installed application. A partial application may software code updates and/or changes to certain elements within the third-party application.

The patch may be downloaded from the entity server. The user computer may download the patch using the dynamic URL. Step 118 may include installing the patch at the user computer. The user computer may install and/or execute the patch file. Installing and/or executing the patch file on the user computer may update the third-party application.

The installation may complete, as indicated at step 120. At step 122, the installation process may sign off. The process may include determining whether the installation was accepted at the user computer, as shown at step 124. Acceptance of the installation may include determining that the upgraded third-party application is compatible with the programs executing on the user computer.

Upon determination that the upgraded third-party application is compatible with the programs executing on the user computer, the upgrade may be accepted, as shown at step 126. Upon acceptance, the process may return to step 102.

Upon determination that the upgraded third-party application is incompatible with the programs executing on the user computer, the upgrade may be rejected, as indicated at step 128. As such, a rollback process may be initiated, as shown at step 130.

The rollback process may include identifying a second to last installed version of the third-party application. At times, the user computer may maintain a log of installed versions. The rollback process may access the log and retrieve the second to last installed version and semantic version number of the second to last installed version that was compatible with the programs installed on the user computer.

The rollback patch process may include retrieving the second to last installed version. At times, the second to last installed version may be stored on the user computer. Therefore, the second to last installed version may be retrieved from the user computer. Other times, the second to last installed version may be stored remotely. As such, the second to last installed version may be accessed via the entity server. The process may revert to step 118 and reinstall the rollback patch identified in step 130.

Figure 2:
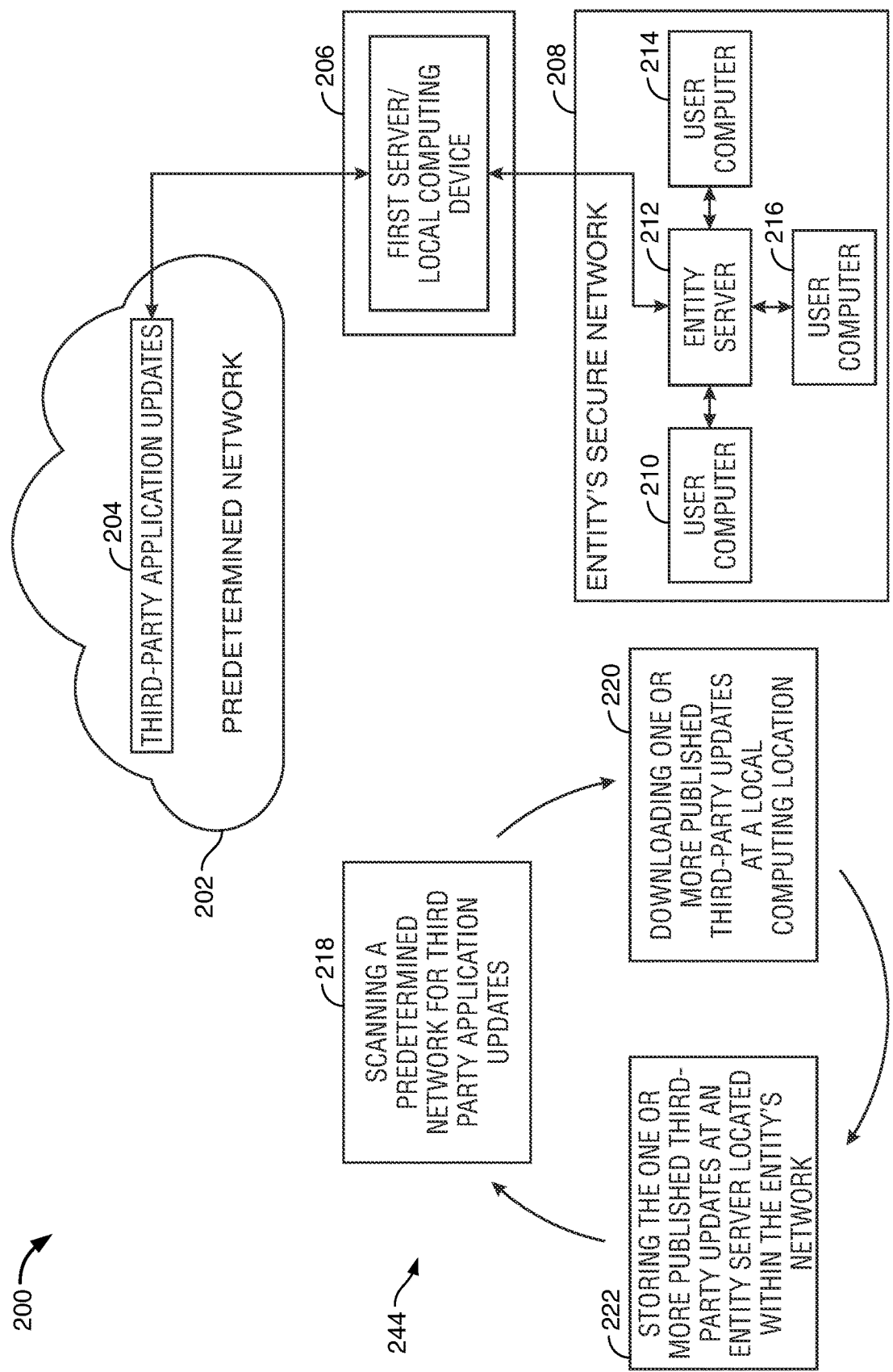
FIG. 2 shows another illustrative diagram in accordance with principles of the invention.

FIG. 2 shows an illustrative diagram of process 200. A first server/local computing device 206 (also referred to herein, as a first server) may communicate with predetermined network 202 and entity server 212. First server 206 may provide a bridge between entity's secure network 208 and predetermined network 202. As such, first server 206 may enable entity server 212 within secure network 208 to access third-party application updates 204. User computers 210, 214 and 216 may access third-party application updates via entity server 212.

Predetermined network 202 may be an open network, such as the Internet. Predetermined network 202 a closed network, such as an intranet. Third-party application updates 204 may be posted to, or stored on, predetermined network 202.

Cycle 244 may include processes 218, 220 and 222. First server/local computer device 206 may execute processes 218, 220 and 222.

Process 218 may show third-party server 206 scanning predetermined network 202 for third-party application updates 204.

Process 220 may show first server 206 downloading one or more published third-party application updates 204 from predetermined network 202. At times, first server 206 may store downloaded third-party application updates at a hardware memory associated with first server 206.

Process 222 shows first server 206 storing third-party application updates 204 at entity server 212. Cycle 224 may repeat continually as third-party application updates 204 are continually released in real-time.

It should be noted that entity's secure network 208 may include entity server 212. Entity's secure network 208 may also include user computers 210, 214, and 216. Entity server 212 and user computers 210, 214, and 216 may be any suitable computing device. Entity's secure network 208 may be a secure network. Entity's secure network 208 may not have access to predetermined network 202. Entity's secure network 208 may be unable to download third-party application updates 204 from predetermined network 202.

It should be further noted that first server 206 may or may not be a component of entity's secure network 208. First server may be configured to store information at entity server 212.

Figure 3:
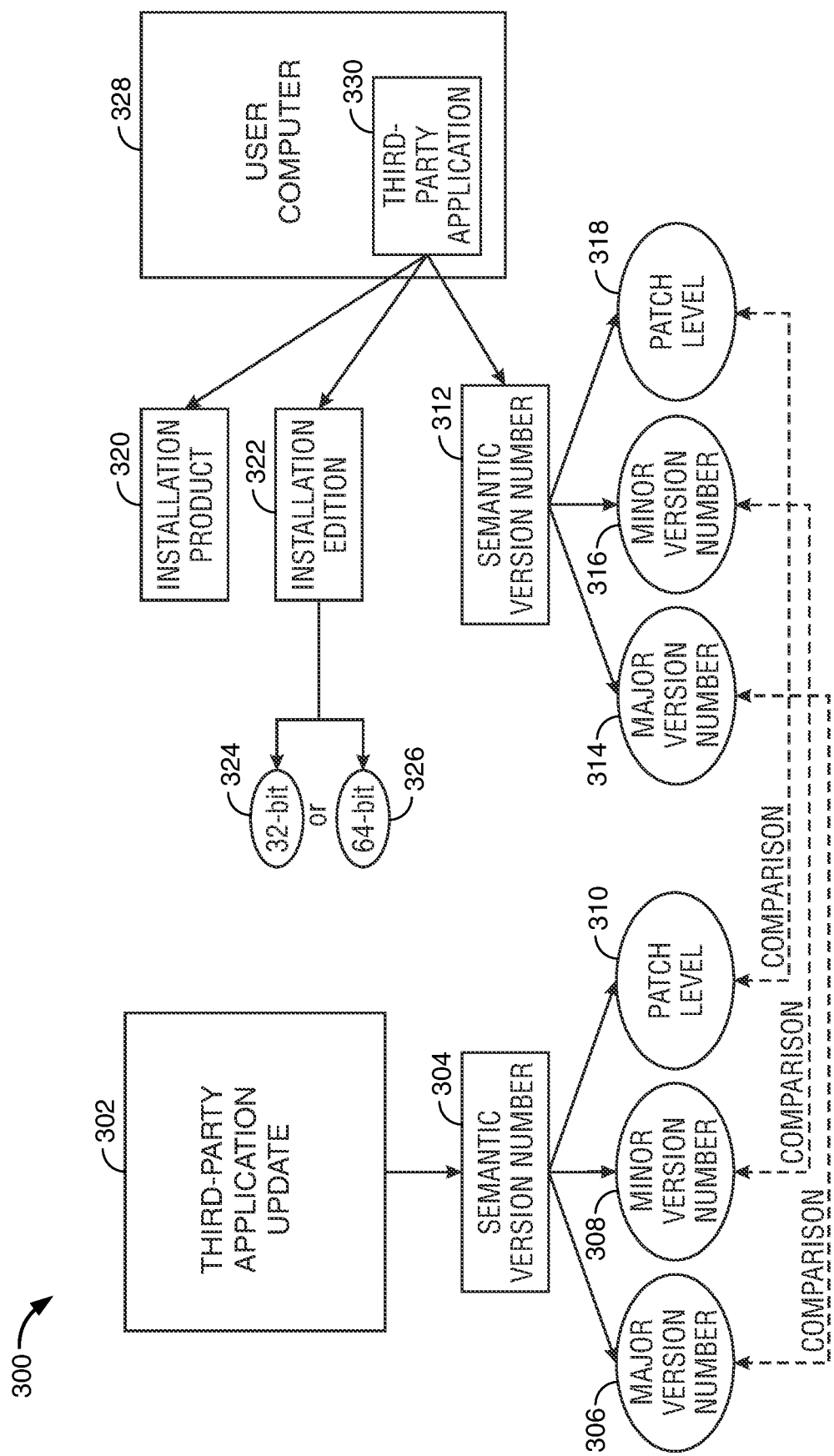
FIG. 3 shows yet another illustrative diagram in accordance with principles of the invention.

FIG. 3 shows an illustrative diagram of process 300. Process 300 may include a comparison between the semantic version number of an application stored on user computer 328 and available third-party application update 302.

User computer 328 may include currently installed third-party application 330. Currently installed third-party application 330 may incorporate installation product 320, installation edition 322 and semantic version number 312. Installation edition 322 may be either a 32-bit edition, shown at 324 or a 64-bit edition, shown at 326. Semantic version number 312 may include major version number 314, minor version number 316 and patch level 318. Semantic version number 312 may be ordered from left to right: major version number 314, minor version number 316 and patch level 318.

Third party application update 302 may also include semantic version number 304. Semantic version number 304 may include major version number 306, minor version number 308, and patch level 310. Semantic version number 304 may be ordered from left to right: major version number 306, minor version number 308 and patch level 310.

When scanning a first server for the most recent third-party application updates, an entity server may compare semantic version number 312 to semantic version number 304. Comparing semantic version numbers 312 and 304 may initially compare major version number 314 to major version number 306. When major version number 306 is less than major version number 314, third-party application update 302 is not a more recent update version of currently installed third-party application 330.

When major version number 306 is greater than major version number 314, third-party application update 302 is a more recent update of currently installed third-party application 330. When major version number 306 is equivalent to major version number 314, minor version number 316 may be compared to minor version number 308. When minor version number 308 is less than minor version number 316, third-party application update 302 is not a more recent update of currently installed third-party application 330.

When minor version number 308 is greater than minor version number 316, third-party application update 302 is a more recent update of currently installed third-party application 330. When minor version number 308 is equivalent to minor version number 316, patch level 318 may be compared to patch level 310. When patch level 310 is less than patch level 318, third-party application update 302 is not a more recent update of currently installed third-party application 330.

When patch level 310 is greater than patch level 318, third-party application update 302 is a more recent update of currently installed third-party application 330. When patch level 310 is equivalent to patch level 318, third-party application update 302 is the same version as currently installed third-party application 330.

When third-party application update 302 is not a more recent update of currently installed third-party application 330, the patching process may abort. When third-party application update 302 is the same version as currently installed third-party application 330, the patching process may abort. When third-party application update 302 is a more recent update than currently installed third-party application 330, the patching process may continue.

Figure 4:
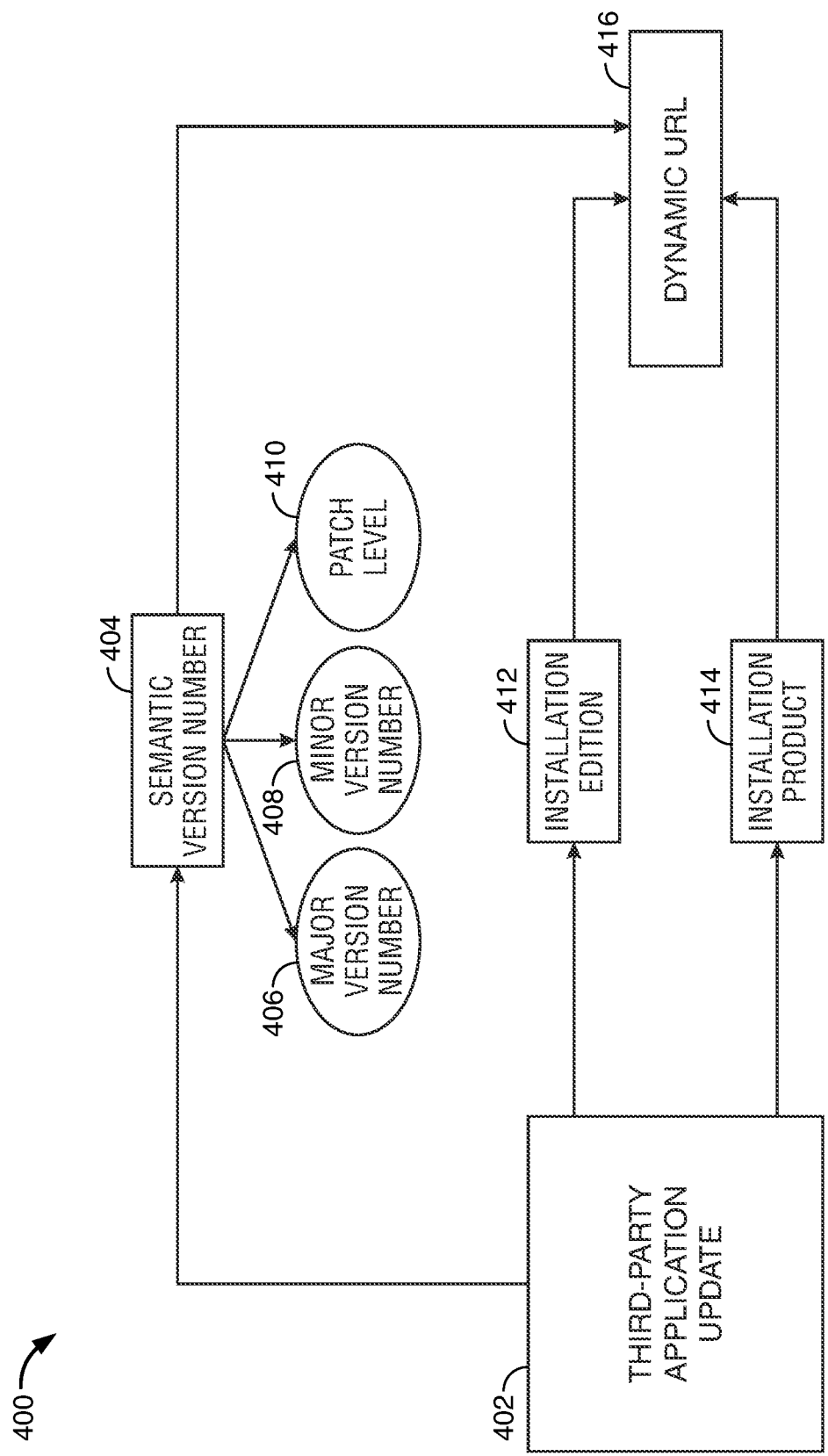
FIG. 4 shows still another illustrative diagram in accordance with principles of the invention.

FIG. 4 shows an illustrative diagram of process 400. Process 400 may show creating a dynamic URL that may enable a user computer to access a third-party application update. Because the URL is dynamically created in real-time, the dynamic URL may ensure that the update to be downloaded by the user computer is compatible with the user computer.

When downloading third-party application update 402, user computer may create dynamic URL 416. Dynamic URL 416 may include installation product 414, installation edition 412, and semantic version number 404. Semantic version number 404 may include major version 406, minor version 408, and patch level 410. Installation product 414 and installation edition 412 may be determined through the installation product and installation edition of the currently installed version of the third-party application.

Figure 5:
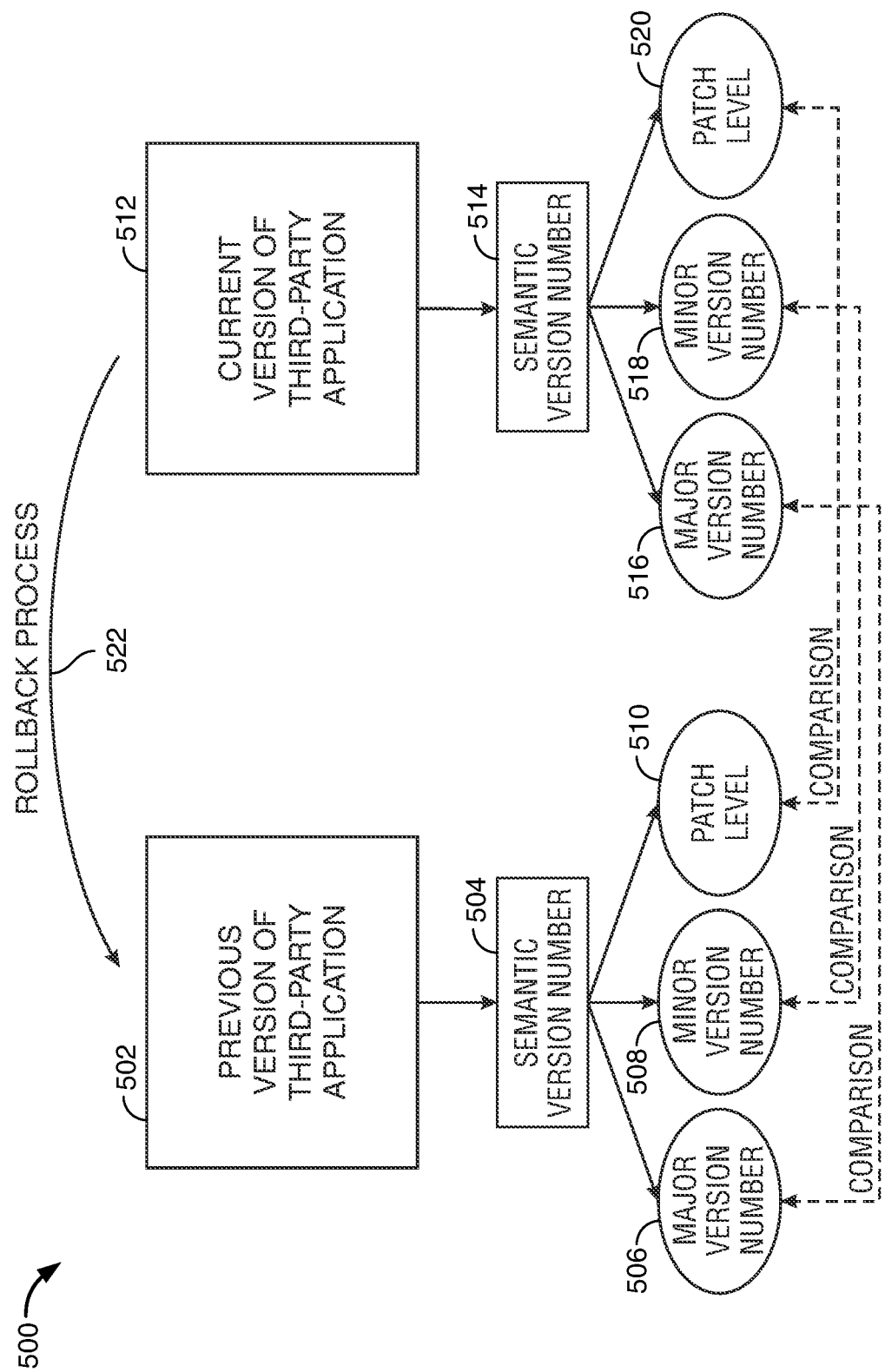
FIG. 5 shows yet another illustrative diagram in accordance with principles of the invention.

FIG. 5 shows an illustrative diagram of process 500. Process 500 shows rollback process 522. Rollback process 522 may involve reinstalling a previous version of a third-party application. Rollback process 522 may be instantiated in the event that a currently installed version is incompatible with one or more applications running a user computer.

Process 500 shows that when current version of third-party application 512 is incompatible with one or more applications on the user computer, the user computer may revert to previous version of third-party application 502.

Rollback process 522 may include identifying semantic version number 514 of currently installed third-party application 512. Identifying semantic version number 514 may include identifying major version number 516, minor version 518 and patch level 520.

Rollback process 522 may also include identifying semantic version number 504 of previously installed version of third-party application 502. Identifying semantic version number 504 may include identifying major version number 506, minor version 508 and patch level 510. Rollback process 522 may also include reinstalling previous version of third-party application 502 on the user computer.

Figure 6:
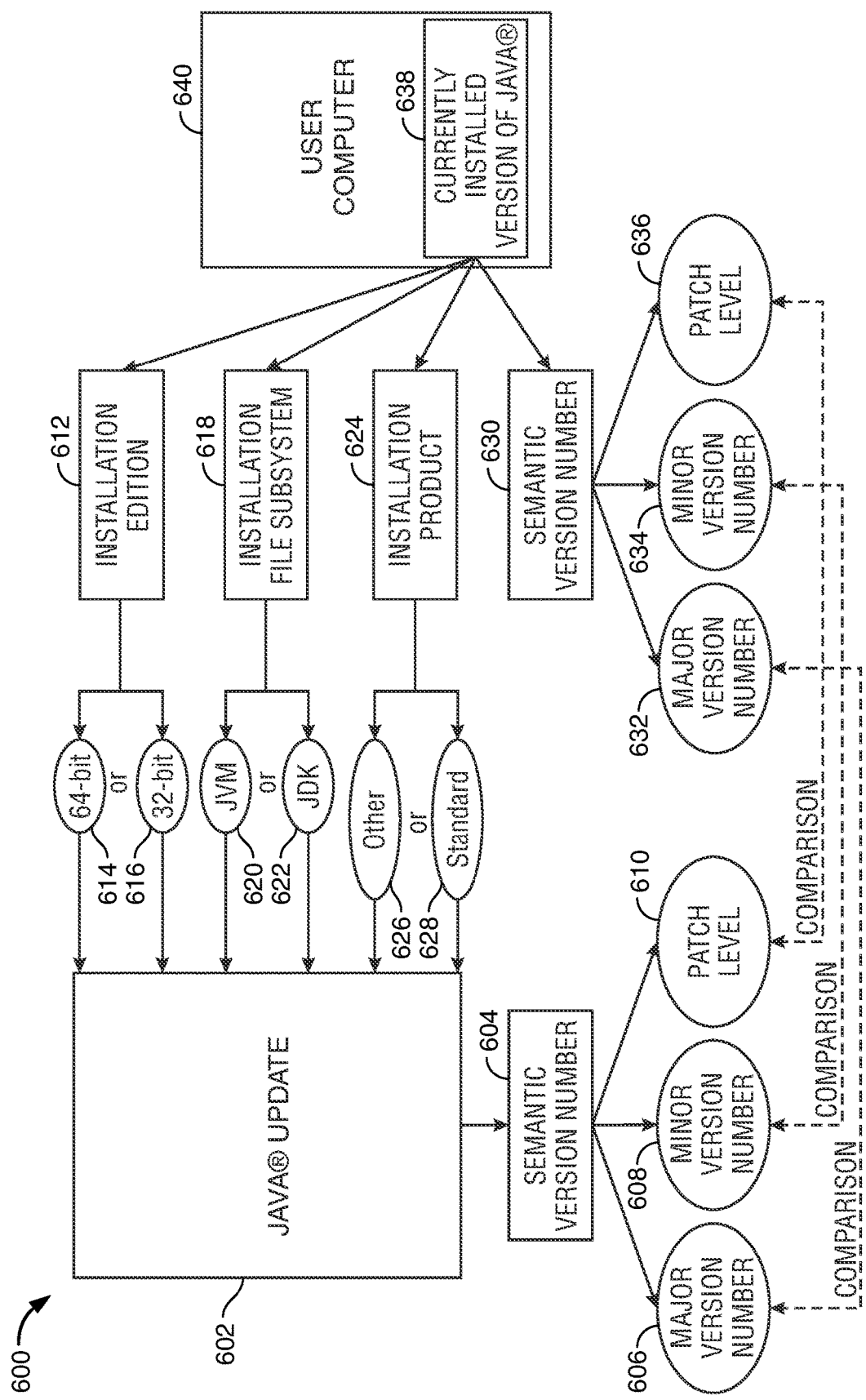
FIG. 6 shows still another illustrative diagram in accordance with principles of the invention.

FIG. 6 shows an illustrative diagram of process 600. Process 600 shows a user computer installing a third-party application update. The third-party application update may be a Java® update.

User computer 640 may include currently installed version of Java® 638. Currently installed Java® application 638 may include installation product 624, installation edition 612, installation file subsystem 618 and semantic version number 630. Installation edition 618 may be either a 32-bit edition, as shown at 614 or 64-bit edition, as shown at 616. Installation file subsystem 618 may be either Java Virtual Machine (JVM®) 620 or Java Development Kit (JDK®) 622. Installation product 624 may identify the product used for installation. Installation product 624 may be BladeLogic installation 626 or standard installation 628. Semantic version number 630 may include major version number 632, minor version number 634, and patch level

636. Semantic version number 630 may be ordered from left to right: major version number 632, minor version number 634 and patch level 636.

Java® update 602 may include semantic version number 604. Semantic version number 604 may include major version number 606, minor version number 608 and patch level 610. Semantic version number 604 may be ordered from left to right: major version number 606, minor version number 608 and patch level 610.

An entity server may scan a first server (a bridge server between an unsecured network and a secure network) for most recent Java® updates. During the scan, the entity server may compare semantic version number 630 to semantic version number 604. Comparing semantic version numbers 630 and 604 may include first comparing major version number 632 to major version number 606. When major version number 606 is less than major version number 632, Java® update 602 is not be a most recent update version of currently installed version of Java® 638.

When major version number 606 is greater than major version number 632, Java® update 602 is a more recent update of currently installed version of Java® 638. When major version number 606 is equal to major version number 632, minor version number 634 may be compared to minor version number 608. When minor version number 608 is less than minor version number 634, Java® update 602 is not a more recent update of currently installed version of Java® 638.

When minor version number 608 is greater than minor version number 634, Java® update 602 is a more recent update of currently installed version of Java® 638. When minor version number 608 is equal to minor version number 634, patch level 636 may be compared with patch level 610. When patch level 610 is less than patch level 636, Java® update 602 is not a more recent update of currently installed version of Java® 638.

When patch level 610 is greater than patch level 636, Java® update 602 is a more recent update of currently installed version of Java® 638. When patch level 610 is equal to patch level 636, Java® update 602 is the same version as currently installed version of Java® 638.

When Java® update 602 is not a more recent update of currently installed version of Java® 638, the patching process may abort. When Java® update 602 is the same version as currently installed version of Java® 638, the patching process may abort. When Java® update 602 is a more recent update of currently installed version of Java® 638, the patching process may continue. The patching process may include downloading Java® update 602 to user computer 640. The patching process may also include installing Java® update 602 on user computer 640.

FIG. 7 shows an illustrative diagram. The illustrative diagram shows a list of available updates. The available updates may be listed in the order in which the update was released. The available updates may be made available on the first server.

Thus, methods and apparatus for ZERO-DAY PATCHING WITHIN AN ENTITY'S SECURE NETWORK are provided. Persons skilled in the art will appreciate that the present disclosure can be practiced by other than the described embodiments, which are presented for purposes of illustration rather than of limitation, and that the present disclosure is limited only by the claims that follow.

What is claimed is:

1. A method for continually patching a Java® application within an entity's secure network, the method comprising:

continually searching, at a first, for Java® updates, said searching comprising:
- scanning a predetermined network for one or more published Java® updates;
- downloading the one or more published Java® updates from the predetermined network to a local computing device, said local computing device located at the first; and
- storing the one or more published Java® updates at an entity server, said entity server located within the entity's secure network;

scanning, at a user computer, said user computer located within the entity's secure network, the entity server for the one or more published Java® updates, said scanning comprising:
- identifying a currently installed version of Java® on the user computer;
- identifying whether an installation edition of the currently installed version of Java® is a 32-bit edition or a 64-bit edition;
- identifying whether an installation product used to install the currently installed version of Java® is a first installation product or a second installation product;
- identifying whether an installation subsystem of the currently installed version of Java® is a Java® Virtual Machine (JVM®) or a Java® Development Kit (JDK®);
- identifying a semantic version number of the currently installed version of Java®, said semantic version number comprising a major version number, a minor version number and a patch level, said identifying comprising:
  - identifying the major version number of the currently installed version of Java®;
  - identifying the minor version number of the currently installed version of Java®; and
  - identifying the patch level of the currently installed version of version of Java®;
- identifying the semantic version number of a most recent published Java® update, said identifying comprising:
  - identifying the major version number of the most recent published Java® update;
  - identifying the minor version number of the most recent published Java® update; and
  - identifying the patch level of the most recent published Java® update;
- comparing the semantic version number of the currently installed version of Java® to the semantic version number of the most recent published Java® update;
- based on the comparing, determining that the semantic version number of the most recent published Java® update is greater than the semantic version number of the currently installed version of Java®;
- based on the determining that the semantic number of the most recent published Java® update is greater than the semantic version number of the currently installed version of Java®, determining that the most recent published Java® update is a more recent version of Java® than the currently installed version of Java®;

building a dynamic uniform resource locator (URL) for the most recent published Java® update, said dynamic URL comprising:

the semantic version number of the most recent published Java® update;
the installation edition;
the installation product; and
the installation subsystem;
downloading, from the entity server to the user computer, the most recent published Java® update; and
installing the most recent published Java® update at the user computer.

2. The method of claim 1, wherein the currently installed version of Java® is incompatible with one or more applications on the user computer, the method further comprising reverting to a previous version of Java®, said reverting comprising:
identifying the semantic version number of the currently installed version of Java®, said identifying comprising:
identifying the major version number of the currently installed version of Java®;
identifying the minor version number of the currently installed version of Java®; and
identifying the patch level of the currently installed version of Java®;
identifying the semantic number of a published version of Java® directly below the currently installed version, said published version of Java® a previous version of Java®, said identifying comprising:
identifying a major version number of the previous version of Java®;
identifying minor version number of the previous version of Java®; and
identifying a patch level of the previous version of Java®; and
reinstalling the previous version of Java®.

3. The method of claim 2, the method comprising overwriting the currently installed version of Java® when reinstalling the previous version of Java®.

4. The method of claim 1 wherein the currently installed version of Java® is incompatible with one or more applications on the user computer, the method further comprising reverting to a previous version of Java®, said reverting comprising:
locating a second to last installed version of Java®, stored at the entity server,
reinstalling the second to last installed version of Java® at the user computer.

5. The method of claim 1, the method further comprising initiating the scanning of the entity server for the one or more published Java® updates upon receiving an execution command on the user computer, said execution command to execute a Java® file.

6. The method of claim 1, wherein the first installation product is a BladeLogic® installation product.

7. The method of claim 1, wherein the second installation product is a standard installation product.

8. The method of claim 1, wherein the comparing comprises:
comparing a numeric value of the major version number of the currently installed version of Java® to a numeric value of the major version number of the most recent published Java® update;
when the numeric value of the major version number of the currently installed version of Java® and the numeric value of the major version number of the most recent published Java® update are the same, comparing a numeric value of the minor version number of the currently installed version of Java® to a numeric value of the minor version number of the most recent published Java® update;
when the numeric value of the minor version number of the currently installed version of Java® and the numeric value of the minor version number of the most recent published Java® update are the same, comparing a numeric value of the patch level of the current version of Java® to the numeric value of the patch level of the most recent published Java® update.

9. The method of claim 8, the method further comprising when the semantic version number of the currently installed version of Java® is the same as the semantic version number of the most recent published Java® update, aborting the downloading and aborting the installing of the most recent published Java® updates.

10. The method of claim 1, further comprising:
when the currently installed version of Java® is a 32-bit edition, downloading a 32-bit Java® edition of the most recent published Java® update; and
when the currently installed version of Java® 64-bit edition, downloading a 64-bit Java® edition of the most recent published Java® update.

11. The method of claim 1, further comprising wherein the first server is the local computing device.

12. A method for continually patching a third-party application within an entity's secure network, the method comprising:
continually searching, at a first server, for third-party application updates, said searching comprising:
scanning a predetermined network for one or more published third-party application updates;
downloading the one or more published third-party application updates from the predetermined network to a local computing device, said local computing device located at the first; and
storing the one or more published third-party application updates at an entity server, said entity server located within the entity's secure network;
scanning, at a user computer, said user computer located within the entity's secure network, the entity server for the one or more published third-party application updates, said scanning comprising;
identifying a currently installed version of a third-party application on the user computer;
identifying an installation edition of the currently installed version of the third-party application;
identifying an installation product of the currently installed version of the third-party application;
identifying a semantic version number of the currently installed version of the third-party application, said semantic version number comprising a major version number, a minor version number and a patch level, said identifying comprising:
identifying the major version number of the currently installed version of the third-party application;
identifying the minor version number of the currently installed version of the third-party application; and
identifying the patch level of the currently installed version of the third-party application;
identifying the semantic number of a most recent published third-party application update, said identifying comprising:
identifying the major version number of the most recent published third-party application update;

identifying the minor version number of the most recent published third-party application update; and identifying the patch level of the most recent published third-party application update;

comparing the semantic version number of the currently installed version of the third-party application to the semantic version number of the most recent published third-party application update;

based on the comparing, determining that the semantic version number of the most recent published third-party application update is greater than the semantic version number of the currently installed version of the third-party application;

based on the determining that the semantic number of the most recent published third-party application update is greater than the semantic version number of the currently installed version of the third-party application, determining that the most recent published third-party application update is a more recent version of the third-party application than the currently installed version of the third-party application;

building a dynamic URL for the most recent published third-party application update, said dynamic URL comprising:

the semantic version number of the most recent published third-party application update;

the installation edition; and, the installation product;

downloading from the server to the user computer, the most recent published third-party application update; and, installing the most recent published third-party application update at the user computer.

13. The method of claim 12, wherein the currently installed version of the third-party application is incompatible with one or more applications on the user computer, the method further comprising reverting to a previous version of the third-party application, said reverting comprising:

identifying the semantic version number of the currently installed version of the third-party application, said identifying comprising:

identifying the major version number of the currently installed version of the third-party application;

identifying the minor version number of the currently installed version the third-party application; and identifying a patch level of the currently installed version of the third-party application;

identifying the semantic number of a published version of the third-party application directly below the currently installed version, said published version of the third-party application a previous version of the third-party application, said identifying comprising:

identifying a major version number of the previous version of the third-party application;

party application; and identifying minor version number of the previous version of the third-identifying a patch level of the previous version of the third-party application; and reinstalling the previous version of the third-party application.

14. The method of claim 13, the method comprising overwriting the currently installed version of the third-party application when reinstalling the previous version of the third-party application.

15. The method of claim 12, wherein the comparing comprises:

comparing a numeric value of the major version number of the currently installed version of the third-party application to a numeric value of the major version number of the most recent published third-party application update;

when the numeric value of the major version number of the currently installed version of the third-party application and the major version number of the most recent published third-party application update are the same, comparing a numeric value of the minor version number of the currently installed version of the third-party application to a numeric value of the minor version number of the most recent published third-party application update;

when the numeric value of the minor version number of the currently installed version of the third-party application and the numeric value of the minor version number of the most recent published third-party application update are the same, comparing a numeric value of the patch level of the currently installed version of the third-party application to a numeric value of the patch level of the most recent published third-party application update.

16. The method of claim 15, the method further comprising when the semantic version number of the currently installed version of the third-party application is the same as the semantic version number of the most recent published third-party application update, aborting the downloading and aborting the installing of the most recent published third-party application updates.

17. An apparatus configured to continually patch a Java® application within an entity's secure network, the apparatus comprising:

an entity server, said entity server located within the entity's secure network;

a local computing device, said local computing device located at a first server, the local computing location configured to:

continually search for one or more published Java® updates, said search configured to;

scan a predetermined network for published Java® updates;

download the one or more published Java® updates from the predetermined network to the local computing device, at the first server; and store the one or more published Java® updates at the entity server located within the entity's secure network;

a user computer, said user computer located within the entity's secure network, said user computer configured to:

scan the entity server for the one or more published Java® updates;

identify a most recent published Java® update;

identify a currently installed version of Java®;

identify whether an installation edition of the currently installed version of Java® is a 32-bit edition or a 64-bit edition;

identify whether an installation product used to install the currently installed version of Java® is a first installation product or a second installation product;

identify whether an installation subsystem of the currently installed version of Java® is a Java® Virtual Machine (JVM®) or a Java® Development Kit (JDK®)®;

identify a semantic version number of the currently installed version of Java®, said semantic version number comprising a major version number, a minor version number and a patch level, said identification configured to:
  identify the major version number of the currently installed version of Java®;
  identify the minor version number of the currently installed version of Java®; and
  identify the patch level of the currently installed version of Java®;
identify the semantic number of the most recent published Java® update, said identification configured to:
  identify the major version number of the most recent published Java® update;
  identify the minor version number of the most recent published Java® update; and
  identify the patch level of the most recent published Java® update;
compare the semantic version number of the currently installed version of Java® to the semantic version number of the most recent published Java® update;
based on the comparing, determine that the semantic version number of the most recent published Java® update is greater than the semantic version number of the currently installed version of Java®;
based on the determination that the semantic number of the most recent published Java® update is greater than the semantic version number of the currently installed version of Java®, determine that the most recent published Java® update is a more recent version of Java® than the currently installed version of Java®;
build a dynamic URL for the most recent published Java® update, said dynamic URL comprised of:
  the semantic version number of the most recent published Java® update;
  the installation edition;
  the installation product; and
  the installation subsystem;
download, from the entity server to the user computer, the most recent published Java® update; and
install the most recent published Java® update at the user computer.

18. The apparatus of claim 17, wherein the first is the local computing device.

19. The apparatus of claim 17, wherein the currently installed version of Java® is incompatible with one or more applications on the user computer, the apparatus further configured to revert to a previous version of Java®, said reverting configured to:
  identify the semantic version number of the currently installed version of Java®, said identification comprising:
    identify the major version number of the currently installed version of Java®;
    identify the minor version number of the currently installed version of Java®; and
    identify the patch level of the currently installed version of Java®;
  identify the semantic number of a published version of Java® directly below the currently installed version, said published version of Java® a previous version of Java®, said identification comprising:
    identifying a major version number of the previous version of Java®;
    identifying minor version number of the previous version of Java®; and
    identifying a patch level of the previous version of Java®; and
  reinstalling the previous version of Java®.

20. The apparatus of claim 19, the apparatus further configured to overwrite the current version of Java® when reinstalling the previous version of Java®.

* * * * *